US008892919B2

(12) United States Patent
Khodorkovsky et al.

(10) Patent No.: US 8,892,919 B2
(45) Date of Patent: Nov. 18, 2014

(54) METHOD AND APPARATUS FOR POWER MANAGEMENT OF A PROCESSOR IN A VIRTUAL ENVIRONMENT

(75) Inventors: Oleksandr Khodorkovsky, Toronto (CA); Stephen D. Presant, San Jose, CA (US)

(73) Assignee: ATI Technologies ULC, Markham, Ontario (CA)

( * ) Notice: Subject to any disclaimer, the term of this patent is extended or adjusted under 35 U.S.C. 154(b) by 424 days.

(21) Appl. No.: 13/325,832

(22) Filed: Dec. 14, 2011

(65) Prior Publication Data

US 2013/0155073 A1 Jun. 20, 2013

(51) Int. Cl.
G06F 1/26 (2006.01)
G06F 1/32 (2006.01)

(52) U.S. Cl.
USPC ........... 713/320; 713/300; 713/322; 713/324; 718/1

(58) Field of Classification Search
CPC ..... G06F 9/5077; G06F 9/45533; G06F 9/50; G06F 9/5027; G06F 1/3206; G06F 1/32
USPC ................... 713/300, 320, 322, 324; 718/1
See application file for complete search history.

(56) References Cited

U.S. PATENT DOCUMENTS

| | | | |
|---|---|---|---|
| 7,191,440 B2 | 3/2007 | Cota-Robles et al. | |
| 7,415,708 B2 * | 8/2008 | Knauerhase et al. | 718/1 |
| 7,624,287 B2 | 11/2009 | Khodorkovsky et al. | |
| 7,734,941 B2 | 6/2010 | Khodorkovsky et al. | |
| 7,739,532 B2 * | 6/2010 | Grobman | 713/322 |
| 8,296,762 B2 * | 10/2012 | Knauerhase et al. | 718/1 |
| 8,364,997 B2 * | 1/2013 | Tian et al. | 713/322 |
| 8,631,099 B2 * | 1/2014 | Morgan | 709/220 |
| 2002/0013802 A1 | 1/2002 | Mori et al. | |
| 2005/0039180 A1 | 2/2005 | Fultheim et al. | |
| 2005/0132362 A1 * | 6/2005 | Knauerhase et al. | 718/1 |
| 2005/0273636 A1 * | 12/2005 | Grobman | 713/322 |
| 2006/0146057 A1 * | 7/2006 | Blythe | 345/506 |
| 2006/0161793 A1 | 7/2006 | Orr | |
| 2007/0192641 A1 * | 8/2007 | Nagendra et al. | 713/320 |
| 2007/0206018 A1 | 9/2007 | Bajic et al. | |
| 2008/0058999 A1 | 3/2008 | Khodorkovsky et al. | |
| 2008/0276235 A1 | 11/2008 | Knauerhase et al. | |
| 2009/0102849 A1 | 4/2009 | Khodorkovsky et al. | |
| 2010/0262722 A1 | 10/2010 | Vauthier et al. | |
| 2011/0057936 A1 | 3/2011 | Gotwalt et al. | |
| 2011/0060924 A1 | 3/2011 | Khodorkovsky | |
| 2011/0060928 A1 | 3/2011 | Khodorkovsky et al. | |
| 2011/0102443 A1 * | 5/2011 | Dror et al. | 345/522 |
| 2011/0148923 A1 | 6/2011 | Sadowski et al. | |
| 2011/0154321 A1 * | 6/2011 | Tian et al. | 718/1 |
| 2011/0213997 A1 | 9/2011 | Kansal et al. | |
| 2011/0264934 A1 | 10/2011 | Branover et al. | |
| 2012/0011378 A1 * | 1/2012 | Dalton et al. | 713/300 |
| 2013/0021353 A1 * | 1/2013 | Drebin et al. | 345/522 |
| 2013/0283073 A1 * | 10/2013 | Jeganathan et al. | 713/320 |

* cited by examiner

*Primary Examiner* — Jaweed A Abbaszadeh

(74) *Attorney, Agent, or Firm* — Faegre Baker Daniels LLP

(57) ABSTRACT

A method and apparatus determines an activity history context for each of a plurality of virtual machines sharing use of a graphics processing core. Each activity history context provides information related to a power setting of at least one engine of the graphics processing core during at least one prior use of the graphics processing core by the corresponding virtual machine. The method and apparatus controls a power setting of the at least one engine of the graphics processing core based on the activity history context corresponding to an active virtual machine using the graphics processing core.

32 Claims, 5 Drawing Sheets

METHOD AND APPARATUS FOR POWER MANAGEMENT OF A PROCESSOR IN A VIRTUAL ENVIRONMENT

BACKGROUND OF THE DISCLOSURE

The present disclosure relates to a power management scheme for a processor operating in a virtual environment, and more particularly to power management for a graphics, multimedia or other special function processor being used by a plurality of different virtual machines.

Virtualization relates to the creation and management of separate software environments or "virtual machines" (VMs) operating on a physical machine, or host system. The host system is logically partitioned so that the underlying hardware of the physical machine is time shared and appears to be independently operating VMs. The software running in a VM (such as an operating system or an application) is collectively referred to as guest software. Therefore, each VM functions as a self-contained platform, running its own guest operating system (OS) and guest application software.

A hypervisor or virtual machine manager (VMM) is a software program that allows multiple VMs to share a single hardware host system. The hypervisor schedules and manages the allocation of the host hardware resources to the different VMs. The guest operating system of each VM appears to have the host's processor, memory, and other resources all to itself. The hypervisor controls the host's processor and other resources, allocating what is needed to each VM. Hypervisors typically rely on time-slicing between various VMs according to round-robin or priority-based schemes, for example, to allocate resources to the various VMs. Time slices allocated to each VM may be stored in a memory so that the hypervisor periodically switches between the VMs based on the allocated time slices.

The use of a processing core by multiple VMs is well known. For instance, one VM may be operating Microsoft Windows® and another VM may be operating Linux. Input output (I/O) devices are typically assigned to one VM at a time. A hypervisor running on the processing core manages allocation of the physical machines such as central processing core and a graphics processing core to the various VMs. In conventional virtualization systems, the hypervisor allocates the graphics processing core as a physical resource to one of the VMs at a time as discussed above. This conventional system may include multiple graphics processing cores in a one-to-one relationship with the VMs. In other prior art virtualization examples, one VM controls the graphics processing core while other VMs emulate rendering functions in software. An end user can switch ownership of the graphics processing core between the multiple VMs.

In another embodiment, the hypervisor may show the user a window inside another window on a display for managing ownership of the graphics processing core. The graphics processing core typically flushes out content for one VM and composites or integrates it within the content of the next VM. This time multiplexing of the physical machine is done on a coarse basis. In other words, the graphics processing core is assigned to the VM for a long time interval sufficient to permit a graphics processing task used by the virtual machine to be completed. This approach typically requires significant hypervisor oversight to manage allocation of the graphics processing core.

In a non-virtual environment, a graphics driver defines the operating range settings of the graphics processing core frequencies and voltages based on factors such as display bandwidth, decoding, encoding and other requirements for current display configurations and active applications. These operating range settings are then programmed into hardware memory for use by a power management unit (PMU) of the graphics processing core.

In a virtual environment, each VM typically includes its own graphics driver that requests power management operating range settings of the graphics processing core including operating frequencies and voltages for various engines of the graphics processing core based on the operating conditions of the associated VM. However, different VMs often run different application mixes that require different graphics processing core power management operating ranges.

Current methods under utilize graphics processing core performance when such graphics processing cores could handle graphic rendering requirements for multiple VMs. In addition, VMs may rely on or benefit from graphics processing core functionality for parallel computing independent of graphics rendering functions. Accordingly, it is desired to provide a finer grain approach to multiplexing of a graphics processing core between a plurality of VMs.

Therefore, there exists a need to determine appropriate graphics processing core power settings to satisfy the requirements of the multiple VMs while reducing and/or managing power consumption of the graphics processing core.

BRIEF DESCRIPTION OF THE DRAWINGS

The embodiments will be more readily understood in view of the following description when accompanied by the below figures and wherein like reference numerals represent like elements, wherein.

DETAILED DESCRIPTION OF THE PREFERRED EMBODIMENTS

Figure 1:
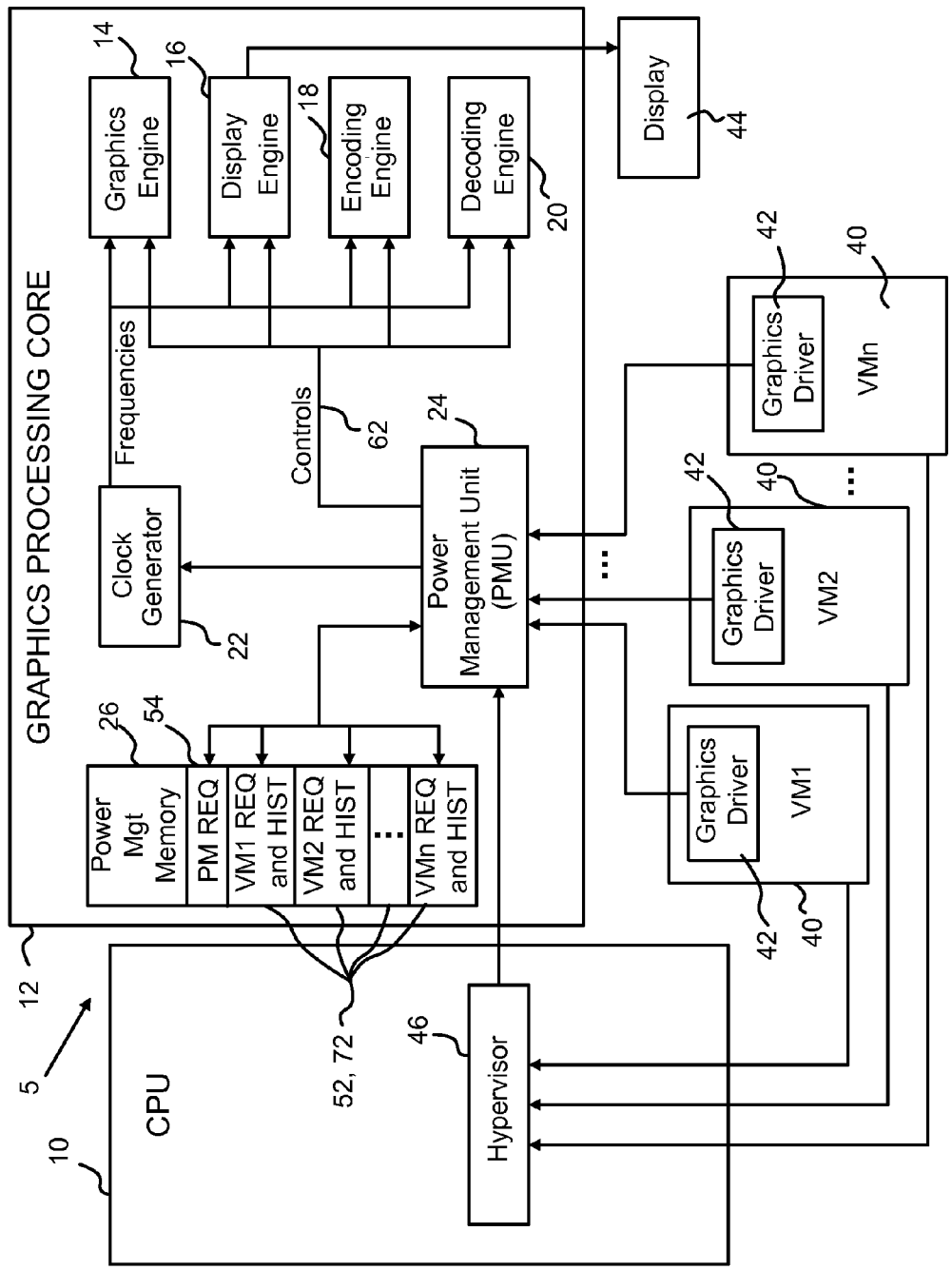
FIG. 1 is a block diagram illustrating an exemplary central processing unit (CPU) and graphics processing core of the present disclosure operating in a virtual environment with a plurality of virtual machines sharing the graphics processing core.

The present disclosure relates to a power management scheme for a processor operating in a virtual environment, and more particularly to power management for a processor being used by a plurality of different virtual machines.

Briefly, in one example, a method and apparatus monitors utilization of at least one engine of a graphics processing core for each of a plurality of virtual machines sharing use of the graphics processing core, and then controls a power setting of at least one engine of the graphics processing core responsive to previously monitored utilization of the at least one engine for an active virtual machine using the graphics processing core. Therefore, the present method and apparatus advantageously optimizes performance of the plurality of virtual machines on the graphics processing core on a much finer-grain level than conventional systems.

In an illustrated embodiment, a method and apparatus determines an activity history context for each of a plurality of virtual machines sharing use of a graphics processing core. Each activity history context provides information related to utilization of at least one engine of the graphics processing core by the corresponding virtual machine. The method and apparatus also controls a power setting of the at least one engine of the graphics processing core based on the activity history context corresponding to an active virtual machine using the graphics processing core.

In an exemplary embodiment, the method and apparatus determines whether to inhibit a power setting change from the activity history context of an active virtual machine based on at least one of a temperature and a power consumption level of the graphics processing core independent of which virtual machine is running. In another exemplary embodiment, the method and apparatus determines whether to inhibit a power setting change from the activity history context of an active virtual machine based on an estimated active time period for the active virtual machine determined from its activity history context relative to a time required to implement the power setting change. Therefore, the present method and apparatus advantageously determines appropriate power settings for an active virtual machine using various engines of the graphics processing core for optimal performance based on a combination of prior uses by the active virtual machine and based on general power consumption factors across the plurality of virtual machines sharing the graphics processing core.

In one example, the method and apparatus sets a power setting of the at least one engine of the graphics processing core to a power setting from the activity history context of the active virtual machine. The information in the activity history context related to a power setting of at least one engine of the graphics processing core is at least one of a frequency setting and a voltage setting for the at least one engine during at least one prior use of the graphics processing core by the active virtual machine. The information is also related to a length of a time that the virtual machine used the graphics processing core during at least one prior use of the graphics processing core by the corresponding virtual machine.

In an exemplary embodiment, the method and apparatus determines the activity history context for each of a plurality of virtual machines by monitoring activity of each active virtual machine to determine its corresponding activity history context and stores the determined activity history context in a memory. Each stored activity history context is linked to a unique identifier of a corresponding virtual machine so that a particular activity history context may be identified and used when the virtual machine is active on the graphics processing core.

In still another illustrated example, the method and apparatus also controls the power setting of the at least one engine of the graphics processing core based on a determined power consumption level of the graphics processing core independent of which virtual machine is running.

In yet another illustrated example, the method and apparatus monitors utilization of the active virtual machine and increases a power setting for at least one engine of a graphics processing core if utilization of the at least one engine by the active virtual machine exceeds a threshold level. The method and apparatus decreases a power setting for at least one engine of a graphics processing core if utilization of the at least one engine by the active virtual machine is less than a threshold level. The monitored utilization is used to determine the activity history context for each of the active virtual machines.

In another illustrated example, the method and apparatus receives a notification of a switch from the active virtual machine to a new virtual machine, stores the activity history context from the active virtual machine related to the power settings of at least one engine of a graphics processing core, and stores a time duration that the active virtual machine used the graphics processing core. The method and apparatus then controls a power setting of at least one engine of the graphics processing core based on an activity history context for the new virtual machine running on the graphics processing core.

For the purposes of promoting an understanding of the principles of the present disclosure, reference will now be made to the embodiments illustrated in the drawings, which are described below. The embodiments disclosed below are not intended to be exhaustive or limit the disclosure to the precise form disclosed in the following detailed description. Rather, the embodiments are chosen and described so that others skilled in the art may utilize their teachings. Therefore, no limitation of the scope of the claimed invention is thereby intended. The present invention includes any alterations and further modifications of the illustrated devices and described methods and further applications of the principles of the invention which would normally occur to one skilled in the art to which the invention relates. Corresponding reference characters indicate corresponding parts throughout the several views.

Referring now to the drawings, FIG. 1 illustrates an exemplary system or integrated circuit 5 including a central processing unit (CPU) 10 and a graphics processing core 12 having a plurality of subsystems such as a graphics engine 14, a display engine 16, and encoding engine 18, and a decoding engine 20. Graphics processing core 12 includes a combination of hardware and software components used to generate two-dimensional, three-dimensional and/or multimedia graphics for display by an electronic computing device to which it is electrically connected. Graphics processing core 12 provides the hardware component of the graphics subsystem. The graphics subsystem may be implemented as a single application-specific integrated circuit (ASIC). The graphics subsystem may also be integrated directly with other circuitry of a host devise or may be a dedicated graphics card connected to a mother board of the host device via a communication link. Host devices which may use the graphics processing core 12 may include personal computers, notebook or laptop computers, portable video game units, portable digital assistants, cellular telephones and the like. The host device typically includes a display on which the graphics generated by graphics processing core 12 are displayed. In some embodiments of system 5, graphics processing core 12 may be optionally connected to display 44.

The graphics processing core 12 affects power management scheme which is a focus of the present disclosure. Therefore, only components of the graphics processing core 12 pertaining to the power management scheme are illustrated in the drawings. Graphics engine 14, display engine 16, encoding engine 18, and decoding engine 20 are all coupled to a clock generator 22 which provides variable operating frequencies to the engines 14, 16, 18 and 20. A power management unit (PMU) 24 of the graphics processing core 12 provides control signals to, and receives status from, each of the graphics engine 14, display engine 16, encoding engine 18, and decoding engine 20. Power management unit 24 is also coupled to the clock generator 22 and to a power management memory 26. Memory 26 may be an on-chip memory or an external memory. If memory 26 is integrated on chip, it may be integrated into the power management unit 24.

Power management unit 24 sets various power settings or power states for the engines 14, 16, 18 and 20 of the graphics processing core 12. Each power state has a corresponding operational frequency and voltage level. Power states having higher voltages and frequencies typically provide greater speed and performance. However, higher voltages and frequencies also produce greater heat and power consumption. For example, the power management unit 24 may set clock frequencies and voltages supplied to the graphics engine 14, display engine 16, coding engine 18, and decoding engine 20 to a low power state, a partially active state, or a fully active high power state. In a low power state, the graphics processing core 12 and associated devices can have settings set to sub-operational levels. In a partially active state, one or more of the engines 14, 16, 18 or 20 or other circuit blocks of the graphics processing core 12 can be deactivated or operate at a reduced frequency. For example, a graphics processing core 12 used solely for display purposes can have its graphics engine 14 and other non-display related circuit blocks in a sub-operational state. In a fully active, high power-state, the graphics processing core 12 and at least one of its associated engines are fully active.

In prior art systems, a graphics processing core 12 is allocated to single virtual machine 40 on a coarse basis for sufficient time periods to permit the graphics processing task used by the virtual machine 40 to be completed. In the system and method of the present disclosure, multiple virtual machines (VMs) 40 may be allocated to the graphics processing core 12 on a much finer-grain level than conventional systems. Therefore, the plurality of VMs 40 use the graphics processing core 12 substantially simultaneously as illustrated in FIG. 1. Different VMs 40 run different application mixes that require different operating frequency ranges for the various engines of the graphics processing core 12. Accordingly, there exists a need for an improved method and apparatus for controlling graphics processing core power settings when a plurality of VMs 40 share the graphics processing core 12 on a fine-grain level.

The system and method of the present disclosure relates to controlling power levels of a graphics processing core 12 in a virtual environment. In an illustrated embodiment of the present disclosure shown in FIG. 1, a plurality of VMs 40, labeled as VM1, VM2, . . . VMn, share the physical resources of the host system graphics processing core 12. Each VM 40 typically includes an associated VM graphics driver 42.

Shared physical resources such as memory, hard disk, network and other hardware resources including engines 14, 16, 18 and 20 of the graphics processing core 12 are managed by a virtual machine monitor (VMM) or hypervisor 46. The hypervisor 46 is a software layer executing on a central processing unit (CPU) 10 which manages virtualization. Each of the VMs 40 includes a virtual platform running a guest operating system and one or more guest applications. Since the physical resources of the host graphics processing core 12 are shared by a plurality of VMs 40, the hypervisor 46 schedules and manages allocation of the host graphics processing core platform hardware resources for the plurality different VMs 40. The hypervisor 46 allocates necessary resources to each guest operating system to make sure that the VMs 40 do not disrupt each other.

Figure 2:
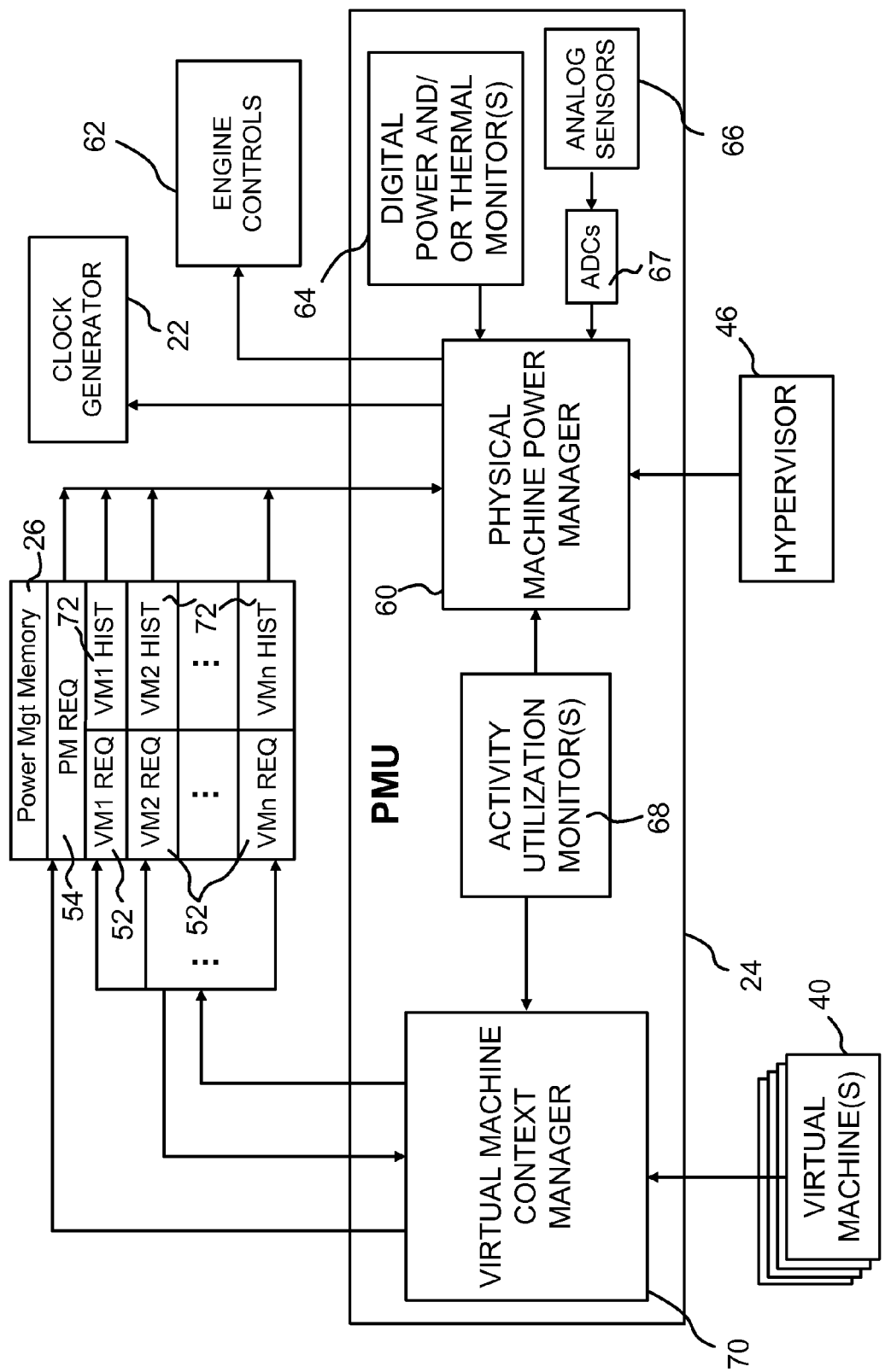
FIG. 2 is a block diagram illustrating additional details of a power management unit of the graphics processing core of the present disclosure.

Additional details of the power management unit 24 are shown in FIG. 2. In an illustrated embodiment, the components of the power management unit 24 may be firmware running on an embedded microcontroller that receives input requests from hypervisor 46 and sends dynamic power adjustment decisions for clock frequency settings and other control of the graphics processing core engines 14, 16, 18 and 20.

The power management unit 24 includes a physical machine power manager 60 in operative communication with hypervisor 46. The physical machine manager 60 controls the voltage and frequency of the graphics processing core 12. In one example, there are multiple voltage domains, and one or more clock domains for each voltage domain. In one example, there are discrete set of power states, such that the physical machine power manager 60 selects one power state from the set. Alternatively, there may be a more continuous range of valid voltages and frequencies for each voltage domain and the physical machine power manager 60 selects any valid setting for providing clock frequencies and voltages to the various subsystems (engines 14, 16, 18, 20, for example) of the graphics processing core 12.

The physical machine power manager 60 has one or more goals when selecting voltage and frequency settings for the subsystems including minimizing energy usage, maximizing performance, and avoiding thermal faults. Often a combination or compromise is needed, such as (1) maximize performance while avoiding thermal faults; or (2) minimize energy while maintaining minimum or good performance levels.

The physical machine power manager 60 is also in operative communication with digital power and/or thermal monitor(s) 64. The digital power and thermal monitor(s) 64 monitor overall temperature of the graphics processing core 12 independent of which VM 40 is running. Power consumption does not directly track voltage and frequency due to aggressive clock gating. This means that different applications, or even timing intervals within an application, will consume different levels of power. A digital power monitor 64 is used to help estimate power consumption based on various digitally tracked conditions. These conditions might include clock gating enable signal, performance counters, or other event counters. As discussed below, the physical machine power manager 60 considers both temperature and power consumption to determine whether a voltage and frequency state change for a subsystem of the graphics processing core 12 should be executed.

The physical machine power manager 60 is also in operative communication with a plurality of analog sensors 66. Analog sensors 66 detect temperature, current draw, or other physical phenomenon. These "sensed" phenomenons are digitized by analog to digital converters (ADCs) 67 and provided to the physical power manager 60. For example, a higher temperature may cause an analog temperature sensor 66 to output a higher voltage, and then an ADC 67 may generate and N bit integer value that represents that temperature. The physical machine power manager 60 may compare the sensed temperature from the analog sensor 66 to a reference threshold. If the sensed temperature exceeds a threshold, then action must be taken to reduce power consumption.

The power management unit 24 also includes one or more activity utilization monitors 68. The activity utilization monitors 68 are in operative communication with the physical machine power manager 60. The activity utilization monitor(s) 68 is (are) also in operative communication with a virtual machine context manager 70. The activity utilization monitor(s) 68 tracks use of each subsystem of graphics processing core 12. In other words, activity utilization monitor(s) 68 track what percentage of the time that a particular subsystem (engines 14, 16, 18, 20, for example) is active. When subsystems of the graphics processing core 12 that use a particular clock domain are only active some of the time, there is an opportunity for that clock domain to run at a lower frequency without significantly reducing performance. If all of the clock domains within a voltage domain can reduce their frequency, then the voltage for that voltage domain can also be reduced.

Hypervisor 46 provides power management unit 24 information including, for example, VMs 40 switch information, a unique identifier associated with each VM 40, and virtual machine power control settings requests (VM1 REQ, VM2 REQ, . . . VMn REQ) which provide graphics processing core power management requirements for each VM 40. Virtual machine context manager 70 stores virtual machine power control setting requests received from the active VM 40 in memory locations 52. Unique memory 26 addressing associated with the active VM 40 is used. The virtual machine context manager 70 also receives activity history context information from activity utilization monitor(s) 68. The activity history context corresponding to each active VM 40 is stored in locations 72 of memory 26. Details of the activity history context are discussed below.

The digital power and thermal monitors 64 are tangential to virtualization and are not required for aspects of the present invention. Digital power monitor 64 tracks power across multiple VMs 40. Similarly, digital thermal monitor 64 tracks temperature of the graphics processing core 12 across multiple VMs 40. The analog sensors 66 are also independent of virtualization. Temperature doesn't instantly change when a VM 40 switch occurs. In other words, the temperature does not return to the temperature the last time the VM 40 ran, and the VM inherits the temperature of the physical system when its time slice begins and as a result its operating frequency may be affected Utilization monitor(s) 68 do track each VM 40 separately. Therefore, if a subsystem of graphics processing core 12 was heavily used the last time a VM 40 ran, then the same subsystem is likely to be heavily used again the next time the same VM 40 runs. So, returning the clock frequencies for the subsystems to the same frequencies as prior uses is desirable for an active VM 40, as long as such frequency changes won't cause thermal instability for the system. Digital power and thermal monitor(s) 64 and analog sensors 66 permit the physical machine power manager 60 to determine whether such frequency changes will cause thermal instability for the system. There is also an overhead or latency to change frequency and voltage. Therefore, if the active VM 40 is only going to run for a short time, it may be less efficient to optimize voltages and frequencies for the VM 40. Therefore, it is useful to have a utilization activity history context for each subsystem 14, 16, 18, 20 of graphics processing core 12 for each VM 40 which includes a length of a time slice that the VM 40 was active the last one or more time(s) the VM 40 ran.

As discussed above, virtual machine power control setting requests are stored in memory locations 52 of power management memory 26. These power control setting requests illustratively include the maximum and minimum operating frequencies for different engines of the graphics processing core 12 for each of the VMs 40. However, in actual operation, the VMs 40 may be operated at multiple intermediate frequency levels or power states between the minimum and maximum frequency levels or power states set by power control setting requests. These actual operational frequency levels for each VM 40 are monitored by activity utilization monitors 68 during use of the graphics processing core 12 to determine a portion of the activity history context which is subsequently stored in locations 72 of memory 26. For example, for each VM there may be two data structures, REQ and HIST. The REQ data structure may include the minimum frequency and desired frequency for each clock domain within the graphics processing core 12. The HIST data structure may include the average utilization of each engine and the clock frequency at which that utilization was observed, for one or more activity timing intervals. These activity timing intervals may or may not correspond to VM time slices. In one example, a ring buffer may be used to store the last N activity samples, to calculate running averages, and to provide an index of the buffer location to store the next sample.

Activity utilization monitor(s) 68 may provide a percentage utilization of each graphics processing core subsystem, such as engines 14, 16, 18 or 20, including frequency settings (clock frequencies, either independent or shared with other subsystems) about one or more previous time slices that a particular VM 40 ran. The activity history context may further include a configuration of resource information that could affect utilization about one or more previous time slices that the VM 40 ran. For example, some resources within an engine may be turned off during operation which would increase the utilization of the overall engine due to its diminished throughput.

The virtual machine activity history context may also include a duration of the time slice that the corresponding VM 40 remained active during one or more previous times that the VM 40. Therefore, the physical machine power manager 60 can influence power state changes based upon the expected amount of time that a VM 40 will likely run.

In addition, the virtual machine history context may include average power and temperature during one or more previous time slices when the VM 40 was active. Power management unit 24 also maintains average power and temperature readings across the physical machine independent of which VM 40 is running provided by the digital power and/or thermal monitors 64 and/or the analog sensors 66. The general power considerations of the device affect whether or not the device is changed to a different power state, even if such power state change is provided in the activity history context. For example, if the temperature of the graphics processing core 12 is too high, a frequency setting from virtual machine history context will not be used to increase the clock frequency if such increase would cause the machine thermal design power (TDP) limits to be exceeded. The activity monitors may be physically implemented as a set of counters. For example, one counter may count valid transaction status, and another counter may count the total possible transactions. The raw utilization is inferred by the ratio of valid count to maximum possible count. The raw utilization may vary temporarily and can be filtered of multiple activity timing intervals to capture an average or weighted utilization of the last N activity timing intervals. An engine's utilization is often affected by its operating clock frequency. For example, at a high clock frequency the engine's throughput may exceed the throughput of other engines or components in the system that it depends on, and as a result its utilization may be lower.

Figure 3:
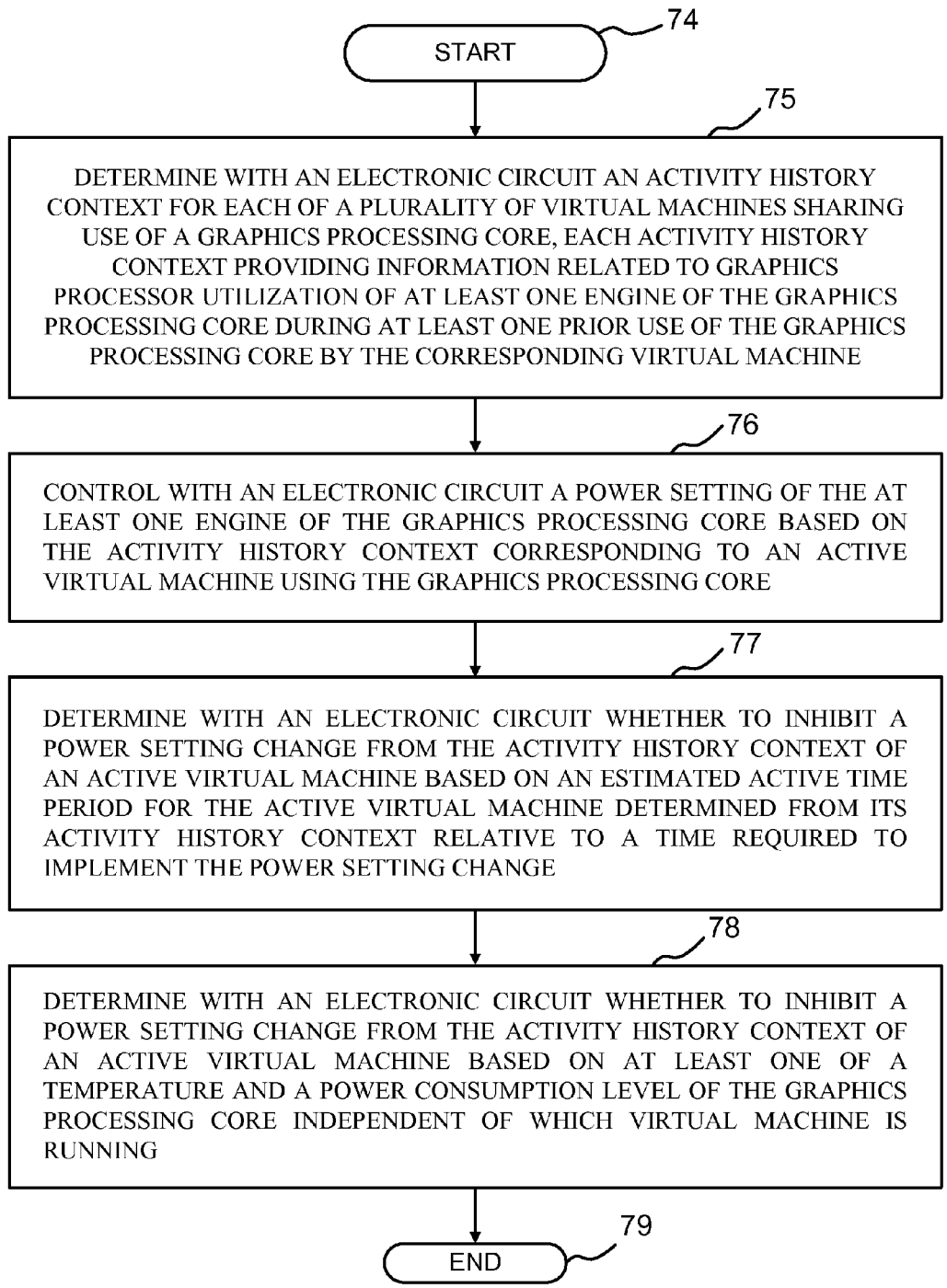
FIG. 3 is a flowchart illustrating an exemplary method for adjusting a power consumption level of a graphics processing core based an activity history context for an active virtual machine.

Details of an example of operation of the power management unit 24 to control power settings of at least one subsystem of a processor, such as at least one engine of a graphics processing core, are illustrated in FIG. 3. The process starts at block 74. The power management unit 24 determines with an electronic circuit an activity history context for each of a plurality of virtual machines sharing use of a graphics processing core as illustrated at block 75. Each activity history context provides information related to a power setting of at least one engine of the graphics processing core during at least one prior use of the graphics processing core by the corresponding virtual machine. The power management unit 24 then controls with an electronic circuit a power setting of the at least one engine of the graphics processing core based on the activity history context corresponding to an active virtual machine using the graphics processing core as illustrated at block 76. Next, the power management unit 24 determines with an electronic circuit whether to inhibit a power setting change from the activity history context of an active virtual machine based on an estimated active time period for the active virtual machine determined from its activity history context relative to a time required to implement the power setting change as illustrated at block 77. The power management unit 24 also determines with an electronic circuit whether to inhibit a power setting change from the activity history context of an active virtual machine based on at least one of a temperature and a power consumption level of the graphics processing core independent of which virtual machine is running as illustrated at block 78. The process ends at block 79. As will be appreciated, the order of the blocks 75-78 can be re-ordered in different embodiments. Additionally, as will be appreciated by one of ordinary skill in the art, power management unit 24 of the exemplary embodiment operates in the exemplary embodiment to manage the power setting of the graphics processing core by accounting for not only temperature, power or the power setting based upon a singular virtual machine but accounting for the power setting based upon a singular virtual machine (e.g., in view of the activity history context of the singular virtual machine) but also the temperature (or power consumption level) of the graphics processing core which may be affected by the activity of other virtual machines operating with the graphics processing core.

Figure 4:
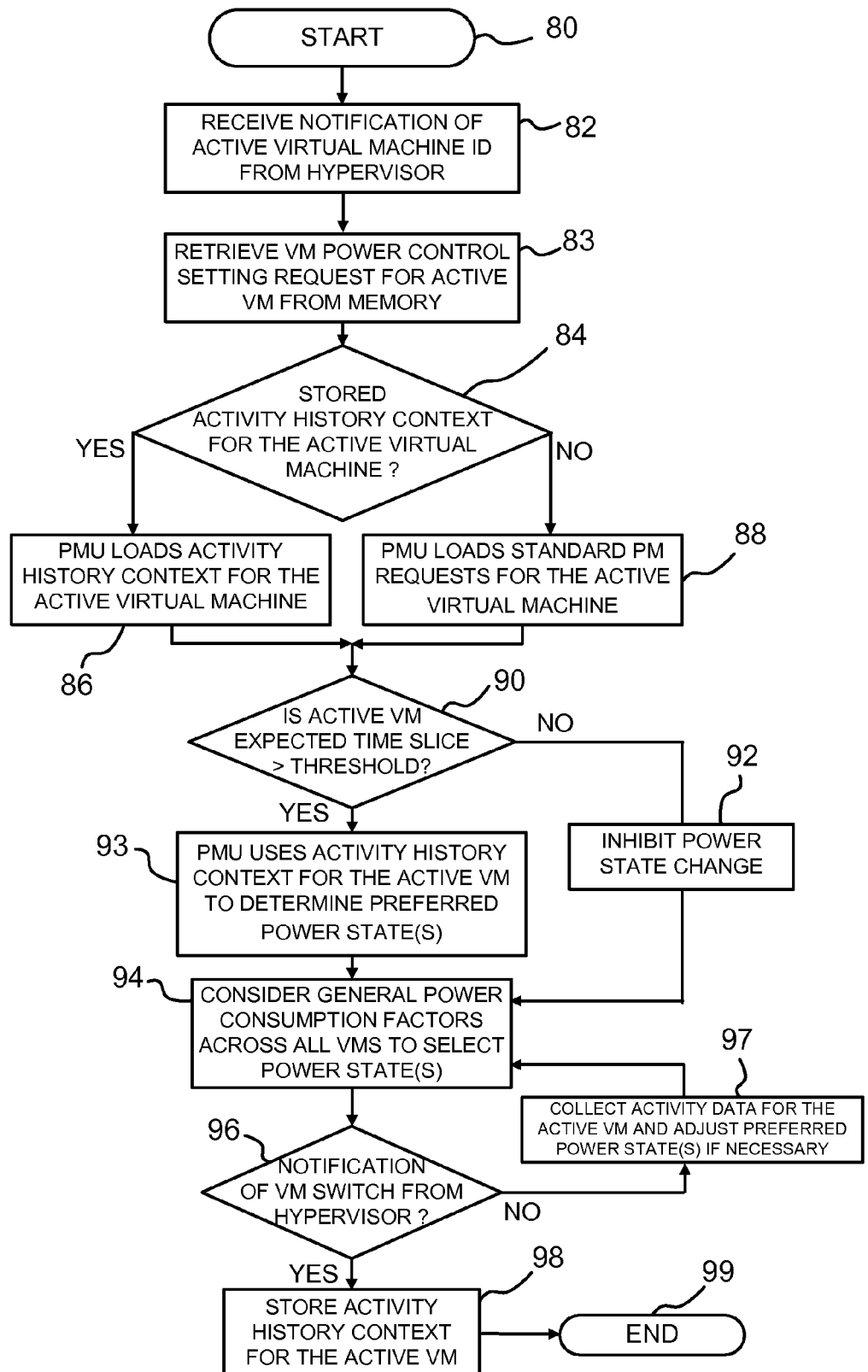
FIG. 4 is a flowchart illustrating additional details of an exemplary method for adjusting a power consumption level of a graphics processing core based an activity history context for an active virtual machine.

Additional details of operation of the power management unit 24 in an illustrated embodiment of the present disclosure are shown in FIG. 4. The process starts at block 80. The power management unit 24 receives a notification from the hypervisor 46 of an active virtual machine identification as illustrated at block 82. Power control setting requests for the active VM 40 are stored at locations 52 of power management memory 26 are retrieved at block 83. These power control settings set the particular operating ranges of engines 14, 16, 18 and 20, for example, of the graphics processing core 12 for each plurality of VMs 40.

Next, the virtual machine context manager 70 determines whether there is a stored activity history context corresponding to the active VM 40 at block 84. In other words, virtual machine context manager 70 determines whether an activity history context for the active VM 40 is stored in one of the memory locations 72 of power management memory 26. Such activity history context should be stored if the particular VM 40 was active on the graphics processing core 12 for one or more previous time slices.

If there is a stored activity history context for the active VM 40 at block 84, the power management unit 24 loads the activity history context for the active VM 40 as illustrated at block 86. For example, the virtual machine context manager 70 may fetch the activity history context for the active VM 40 and load the activity history context into the power management request location 54 of power management memory 26.

If there is not an activity history context corresponding to the active VM 40 at block 84. The power management unit 24 loads standard power control requests for the active VM 40 as illustrated at block 88. Therefore, if no activity history context is stored at location 72 for the identified active VM 40, the virtual machine context manager 70 loads the standard virtual machine power control setting requests (operating ranges) for the active VM 40 into the power management request memory location 54.

Next, physical machine power manager 60 determines whether the active VM expected time slice for utilizing the graphics processing core 12 is greater than a predetermined threshold time value as illustrated at block 90. The expected time slice is also determined from the activity history context by prior VM time slice usage lengths. As discussed above, the system and method of the present disclosure permit more rapid or finer-grain switching between a plurality of VMs using the graphics processing core 12. Performance based power state changes have some latency before they take effect. Therefore, there is some time delay for the engines of the graphics processing core 12 to change from a higher power state to a lower power state or vice versa. When the expected time slice for the new active VM 40 is less than the threshold time value at block 90, a physical machine power manager 60 will inhibit a power state change from occurring as illustrated at block 92. If the expected time slice is too short, the VM 40 could not take advantage of the new power state before the time slice for the VM 40 ends and a switch to another active VM occurs. The new VM may need a different power state.

If the active VM 40 has an estimated active time slice greater than the threshold time at block 90, the power management unit 24 uses the activity history context for the active VM 40 as illustrated at block 93. Therefore, the physical machine power manager 60 adjusts a power state by changing the preferred frequency and voltage settings of the clock generator 22 or engine controls 62 based on the virtual machine activity history context. For example, if the VM 40 used a lower power state for an engine 14, 16, 18, 20 of the graphics processing core 12 during one or more previous time slices, the power manager 60 will prefer to decrease the frequency of the particular engine. Likewise, if the activity history context for the active VM 40 shows that a particular graphics processing core subsystem was set at a higher power state, the physical machine power manager 60 prefer to increase the frequency for that particular graphics processing core subsystem.

As discussed above, the physical machine power manager 60 also considers general power consumption factors of the graphics processing core across all VMs as illustrated at block 92. Therefore, physical machine power manager 60 may inhibit a change to a requested higher power state for a particular graphics processing core subsystem, even if the higher power state is included in the activity history context for the active VM 40, if such power state increase would exceed TDP limits for the device. For example, the physical machine power manager may inhibit any clock frequency increase, or force a reduction in a clock frequency in one or more clock domains, if the current sensed temperature exceeds a temperature threshold, or recent average power exceeds a power threshold.

Next, physical machine power manager 60 determines whether it has received a notification of a virtual machine switch from hypervisor 46 as illustrated at block 96. If not, physical machine power manager 60 continues to consider utilization statistics from the activity utilization monitor(s) 68 and monitor outputs from the digital power and/or thermal monitors 64 and analog sensors 66 to consider general power consumption factors across all VMs at block 94 when considering utilization and power setting changes for the active VM 40 as illustrated at block 97.

If physical machine power manager 60 has received notification of a virtual machine switch from the hypervisor 46 at block 96, the performance history context for the active VM 40 generated by activity utilization monitor(s) 68 is stored in the memory location 72 corresponding to the virtual machine identification of the active VM 40 as illustrated at block 98. The process ends at block 99.

Figure 5:
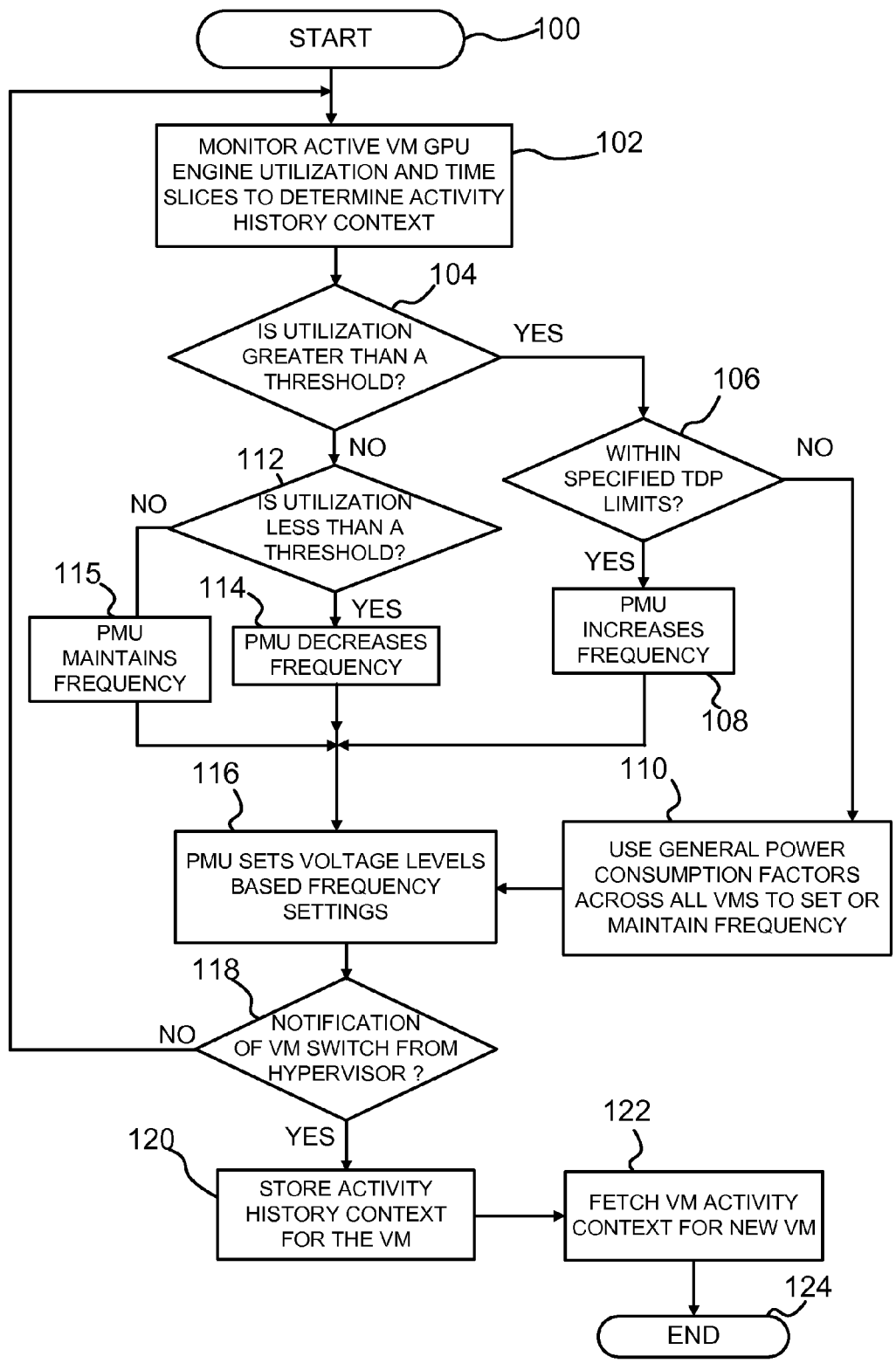
FIG. 5 is a flowchart illustrating details of an exemplary method for monitoring utilization and adjusting the power consumption levels for an active virtual machine using a graphics processing core.

As discussed above, the activity utilization monitor(s) 60 monitor activities of the VM 40 during time slices in which the VM 40 is active on the graphics processing core 12. An example of the method for monitoring utilization and controlling output frequencies from the power management unit illustrated in FIG. 5. The process starts at block 100. A physical machine manager 60 monitors the current VM 40 engine utilization and determines frequency levels as illustrated at block 102.

If the current VM 40 utilization is greater than a threshold value at block 104, the physical machine manager 60 determines whether or not the device is operating within specified TDP limits as illustrated at block 106. The activity utilization thresholds may be configured by the hypervisor, or the active VM (and as such would be part of the VM's REQ data structure) or may be determined by the power management unit 24 based on the cumulative requests from all VMs and the hypervisor 46.

The physical machine manager 60 uses inputs from digital power and/or thermal monitors 64 and analog sensors 66 to determine whether the device is operating within the specified TDP limits at block 106. If the device is operating within the TDP limits at block 106, physical machine power manager increases the frequency for a particular subsystem of graphics processing core 12 as illustrated at block 108. The physical machine manager 60 also considers the power control setting request operating range stored in locations 52 for the active VM 40 so that the frequency for a particular engine 14, 16, 18 and 20 does not rise above a maximum frequency for operating the VM 40.

If the device is not operating within specified TDP limits at block 106, physical machine power manager 60 uses general power consumption factors across all VMs to set or maintain output frequencies from the power management unit 24 as illustrated at block 110. The TDP constraints (upper and lower thresholds, for example) are generally fixed based on the thermo-mechanical limitations of an ASIC package design or platform design. Typically these constraints are configured by fuses within an ASIC or ROM settings, but could be configurable through other means.

If the utilization of a particular VM 40 is not greater than a threshold value at block 104, physical machine power manager 60 determines whether or not the utilization of the VM 40 is less than another threshold value at block 112. If utilization is less than the threshold value, physical machine power manager 60 may decrease the frequency for a particular subsystem in order to conserve power. Physical machine power manager 60 also considers the power control setting requests operating range requests stored in locations 52 for the active VM 40 so that the frequency does not drop below minimum frequency required for the operating VM 40. If the utilization is not less than the threshold value at block 112, physical machine power manager maintains the current frequency as illustrated at block 115. Next, the physical machine power manager 60 of power management unit 24 sets output voltage levels necessary for the frequency settings as illustrated at block 116.

Next, physical machine power manager 60 determines whether it has received a notification from hypervisor 46 of a virtual machine switch as illustrated at block 118. If not, physical machine power manager 60 continues to monitor utilization of the active VM 40 and selectively adjusts the frequency settings based on such utilization, if applicable, as discussed above.

If the physical machine power manager 60 receives a notification of a virtual machine switch from the hypervisor 46 at block 118, the virtual machine context manager 70 stores the activity history context before the active VM 40 in the corresponding memory location 72 of memory 26 as illustrated at block 120 and fetches the virtual machine activity context for the newly identified VM 40 as illustrated at block 122. The process ends at block 124. Physical machine power manager 60 then starts the process over at block 100 to monitor utilization of the new VM 40 and adjust power levels for various graphics processing core subsystems as discussed above.

The present method and apparatus advantageously optimizes performance of the plurality of virtual machines on the graphics processing core on a much finer-grain level than conventional systems. The present method and apparatus also advantageously determines appropriate power settings for an active virtual machine using various engines of the graphics processing core for optimal performance based on a combination of prior uses by the active virtual machine and based on general power consumption factors across the plurality of virtual machines sharing the graphics processing core.

The above detailed description of the invention and the examples described therein have been presented for the purposes of illustration and description only and not by limitation. It is therefore contemplated that the present invention cover any and all modifications, variations or equivalents that fall within the spirit and scope of the basic underlying principles disclosed above and claimed herein.

What is claimed is:

1. A method comprising:
    determining an activity history context for each of a plurality of virtual machines sharing use of a graphics processing core, each activity history context providing information related to utilization of at least one engine of the graphics processing core by the corresponding virtual machine;
    controlling a power setting of the at least one engine of the graphics processing core based on the activity history context corresponding to an active virtual machine using the graphics processing core; and
    determining whether to inhibit a power setting change from the activity history context of an active virtual machine based on at least one of a temperature and a power consumption level of the graphics processing core independent of which virtual machine is running.

2. The method of claim 1, wherein controlling a power setting sets a power setting of the at least one engine of the graphics processing core to a power setting from the activity history context of the active virtual machine.

3. The method of claim 2, wherein the information related to a power setting of at least one engine of the graphics processing core is at least one of a frequency setting and a voltage setting for the at least one engine during at least one prior use of the graphics processing core by the active virtual machine.

4. The method of claim 1, wherein determining an activity history context for each of a plurality of virtual machines sharing use of a graphics processing core comprises monitoring activity of each active virtual machine to determine its corresponding activity history context and storing the determined activity history context in a memory.

5. The method of claim 4, wherein each stored activity history context is linked to a unique identifier of a corresponding virtual machine.

6. The method of claim 1, wherein the determined activity history context also provides information related to a length of a time that the virtual machine used the graphics processing core during at least one prior use of the graphics processing core by the corresponding virtual machine.

7. The method of claim 1, further comprising monitoring utilization of the active virtual machine and increasing a power setting for at least one engine of a graphics processing core if utilization of the at least one engine by the active virtual machine exceeds a threshold level.

8. The method of claim 1, further comprising monitoring utilization of the active virtual machine and using the monitored utilization to determine the activity history context for the active virtual machine.

9. The method of claim 1, further comprising monitoring utilization of the active virtual machine and decreasing a power setting for at least one engine of a graphics processing core if utilization of the at least one engine by the active virtual machine is less than a threshold level.

10. The method of claim 1, further comprising inhibiting a power setting change from the activity history context if the power setting change would cause a thermal fault of the graphics processing core.

11. A method comprising:
   determining an activity history context for each of a plurality of virtual machines sharing use of a graphics processing core, each activity history context providing information related to utilization of at least one engine of the graphics processing core by the corresponding virtual machine;
   controlling a power setting of the at least one engine of the graphics processing core based on the activity history context corresponding to an active virtual machine using the graphics processing core; and
   determining whether to inhibit a power setting change from the activity history context of an active virtual machine based on an estimated active time period for the active virtual machine determined from its activity history context relative to a time required to implement the power setting change.

12. The method of claim 11, further comprising determining whether to inhibit a power setting change from the activity history context of an active virtual machine based on at least one of a temperature and a power consumption level of the graphics processing core independent of which virtual machine is running.

13. A method comprising:
   determining an activity history context for each of a plurality of virtual machines sharing use of a graphics processing core, each activity history context providing information related to utilization of at least one engine of the graphics processing core by the corresponding virtual machine; and
   controlling a power setting of the at least one engine of the graphics processing core based on the activity history context corresponding to an active virtual machine using the graphics processing core and based on a determined power consumption level of the graphics processing core independent of which virtual machine is running.

14. A method comprising:
   determining an activity history context for each of a plurality of virtual machines sharing use of a graphics processing core, each activity history context providing information related to utilization of at least one engine of the graphics processing core by the corresponding virtual machine;
   controlling a power setting of the at least one engine of the graphics processing core based on the activity history context corresponding to an active virtual machine using the graphics processing core;
   determining an estimated active time period for the active virtual machine based on its activity history context; and
   adjusting a power setting for at least one engine of the graphics processing core based on the activity history context if the estimated active time period exceeds a threshold time duration.

15. The method of claim 14, wherein the threshold time duration is a time required to implement the power setting change for at least one engine of the graphics processing core.

16. A method comprising:
   determining an activity history context for each of a plurality of virtual machines sharing use of a graphics processing core, each activity history context providing information related to utilization of at least one engine of the graphics processing core by the corresponding virtual machine;
   controlling a power setting of the at least one engine of the graphics processing core based on the activity history context corresponding to an active virtual machine using the graphics processing core;
   receiving a notification of a switch from the active virtual machine to a new virtual machine;
   storing the activity history context from the active virtual machine related to the power settings of at least one engine of a graphics processing core and a time duration that the active virtual machine used the graphics processing core; and
   controlling a power setting of at least one engine of the graphics processing core based on an activity history context for the new virtual machine running on the graphics processing core.

17. A method comprising:
   monitoring utilization of at least one engine of a graphics processing core for each of a plurality of virtual machines sharing use of the graphics processing core;
   controlling a power setting of at least one engine of the graphics processing core responsive to previously monitored utilization of the at least one engine for an active virtual machine using the graphics processing core; and
   determining whether to inhibit a power setting change from the monitored utilization of the active virtual machine based on at least one of a temperature and a power consumption level of the graphics processing core independent of which of the plurality of virtual machines is running.

18. The method of claim 17, wherein controlling a power setting sets a power setting of the at least one engine of the graphics processing core to a power setting from the monitored utilization of an active virtual machine.

19. The method of claim 17, wherein monitoring utilization of at least one engine of a graphics processing core for each of a plurality of virtual machines sharing use of the graphics processing core comprises determining an activity history context for each of the plurality of virtual machines, each activity history context providing information related to the monitored utilization of at least one engine of the graphics processing core by the corresponding virtual machine, and wherein controlling a power setting of at least one engine of the graphics processing core is based on the activity history context corresponding to the active virtual machine using the graphics processing core.

20. A method comprising:
   monitoring utilization of at least one engine of a graphics processing core for each of a plurality of virtual machines sharing use of the graphics processing core;
   controlling a power setting of at least one engine of the graphics processing core responsive to previously monitored utilization of the at least one engine for an active virtual machine using the graphics processing core; and determining whether to inhibit a power setting change from the monitored utilization of the active virtual machine based on an estimated active time period for the active virtual machine determined from its the monitored utilization relative to a time required to implement the power setting change.

21. The method of claim 20, further comprising determining whether to inhibit a power setting change from the monitored utilization of the active virtual machine based on at least one of a temperature and a power consumption level of the graphics processing core independent of which of the plurality of virtual machines is running.

22. An apparatus comprising:
a graphics processing core having a plurality of engine subsystems used by a plurality of virtual machines, the plurality of engine subsystems being operable at a plurality of power settings;
an activity monitor configured to monitor utilization of the plurality of engine subsystems of the graphics processing core by each active virtual machine to determine an activity history context for each of a plurality of virtual machines, each activity history context providing information related to utilization of at least one engine of the graphics processing core during at least one prior use of the graphics processing core by the corresponding virtual machine;
a physical machine power manager in operative communication with the activity monitor, the physical machine power manager being operable to adjust a power settings of the at least one engine of the graphics processing core based on the activity history context corresponding to an active virtual machine using the processor; and
a power monitor operatively coupled to the physical machine power manager, the power monitor determining a power consumption level of the graphics processing core independent of which virtual machine is running, and wherein the physical machine power manager determines whether to inhibit a power setting change from the activity history context of an active virtual machine based the power consumption level.

23. The apparatus of claim 22, further comprising a context manager in operative communication with the activity monitor, the context manager being operable to store the determined activity history context for each active virtual machine in a memory.

24. The apparatus of claim 23, wherein each stored activity history context is linked to a unique identifier of a corresponding virtual machine.

25. The apparatus of claim 24, wherein the physical machine power manager is operable to retrieve the activity history context corresponding to an active virtual machine from the memory.

26. The apparatus of claim 22, wherein the physical machine power manager is in operative communication with a hypervisor operable to schedule and manage allocation the plurality of virtual machines to the graphics processing core.

27. The apparatus of claim 26, wherein the physical machine power manager receives a unique identifier of an active virtual machines and uses the unique identifier to retrieve an activity history context for the active virtual machine.

28. An apparatus comprising:
a graphics processing core having a plurality of engine subsystems used by a plurality of virtual machines, the plurality of engine subsystems being operable at a plurality of power settings;
an activity monitor configured to monitor utilization of the plurality of engine subsystems of the graphics processing core by each active virtual machine to determine an activity history context for each of a plurality of virtual machines, each activity history context providing information related to utilization of at least one engine of the graphics processing core during at least one prior use of the graphics processing core by the corresponding virtual machine;
a physical machine power manager in operative communication with the activity monitor, the physical machine power manager being operable to adjust a power settings of the at least one engine of the graphics processing core based on the activity history context corresponding to an active virtual machine using the processor; and
a temperature sensor operatively coupled to the physical machine power manager, the temperature sensor determining a temperature of the graphics processing core independent of which virtual machine is running, and wherein the physical machine power manager determines whether to inhibit a power setting change from the activity history context of an active virtual machine based the temperature of the processor.

29. The apparatus of claim 28, further comprising a power monitor operatively coupled to the physical machine power manager, the power monitor determining a power consumption level of the graphics processing core independent of which virtual machine is running, and wherein the physical machine power manager determines whether to inhibit a power setting change from the activity history context of an active virtual machine based the power consumption level.

30. A non-transitory computer readable storage medium comprising executable instructions that when executed by at least one processor causes the at least one processor to:
determine an activity history context for each of a plurality of virtual machines sharing use of a graphics processing core, each activity history context providing information related to a power setting of at least one engine of the graphics processing core during at least one prior use of the graphics processing core by the corresponding virtual machine; and
control a power setting of the at least one engine of the graphics processing core based on the activity history context corresponding to an active virtual machine using the graphics processing core; and
inhibit a power setting change from the activity history context of an active virtual machine based on at least one of a temperature and a power consumption level of the graphics processing core independent of which virtual machine is running.

31. A non-transitory computer readable storage medium comprising executable instructions that when executed by at least one processor causes the at least one processor to:
determine an activity history context for each of a plurality of virtual machines sharing use of a graphics processing core, each activity history context providing information related to a power setting of at least one engine of the graphics processing core during at least one prior use of the graphics processing core by the corresponding virtual machine; and
control a power setting of the at least one engine of the graphics processing core based on the activity history context corresponding to an active virtual machine using the graphics processing core; and
inhibit a power setting change from the activity history context of an active virtual machine based on an estimated active time period for the active virtual machine determined from its activity history context relative to a time required to implement the power setting change.

32. The non-transitory computer readable storage medium of claim 31, further comprising executable instructions that when executed by at least one processor causes the at least one processor to inhibit a power setting change from the activity history context of an active virtual machine based on at least one of a temperature and a power consumption level of the graphics processing core independent of which virtual machine is running.

* * * * *